United States Patent [19]
Baer et al.

[11] Patent Number: 5,920,827
[45] Date of Patent: Jul. 6, 1999

[54] WIRELESS WEATHER STATION

[76] Inventors: John S. Baer, Schooner Head—Box 257; Stephen K. Bohrer, 22 Kennebec St., both of Bar Harbor, Me. 04609; Michael A. Vietti, 42 Balsam Way, Southwest Harbor, Me. 04679

[21] Appl. No.: 08/883,689

[22] Filed: Jun. 27, 1997

[51] Int. Cl.$^6$ .................................................. G06F 19/00
[52] U.S. Cl. ................................................ 702/3; 702/63
[58] Field of Search ............................. 702/3, 4, 61, 63, 702/122, 188, 104, 116; 364/179, 528.26, 528.3, 707; 395/750.03; 340/870.16, 870.17, 601, 602

[56] References Cited

U.S. PATENT DOCUMENTS

| | | | |
|---|---|---|---|
| 3,744,043 | 7/1973 | Walden et al. | 340/870.16 |
| 4,230,989 | 10/1980 | Buehrle | 375/214 |
| 4,277,845 | 7/1981 | Smith et al. | 455/505 |
| 4,287,762 | 9/1981 | Baer | 73/170.16 |
| 4,521,857 | 6/1985 | Reynolds, III | 702/3 |
| 4,706,198 | 11/1987 | Thurman | 701/120 |
| 4,839,645 | 6/1989 | Lill | 340/870.17 |
| 4,866,761 | 9/1989 | Thornborough et al. | 379/106.04 |
| 5,023,934 | 6/1991 | Wheeless | 455/45 |
| 5,117,359 | 5/1992 | Eccles | 702/3 |
| 5,390,237 | 2/1995 | Hoffman, Jr. et al. | 379/88.23 |
| 5,517,193 | 5/1996 | Allison et al. | 702/3 |
| 5,568,385 | 10/1996 | Shelton | 702/3 |
| 5,628,050 | 5/1997 | McGraw et al. | 455/12.1 |
| 5,654,886 | 8/1997 | Zereski, Jr. et al. | 702/3 |
| 5,661,464 | 8/1997 | Bilak et al. | 340/690 |
| 5,689,248 | 11/1997 | Esfahani et al. | 340/853.1 |
| 5,694,428 | 12/1997 | Campana, Jr. | 375/260 |
| 5,734,335 | 3/1998 | Brogi et al. | 340/870.05 |
| 5,784,004 | 7/1998 | Esfahani et al. | 340/854.6 |

*Primary Examiner*—Donald E. McElheny, Jr.

[57] ABSTRACT

A wireless weather station for measuring a number of weather parameters over an extended time at a data collection location. The weather data can be transmitted to a remote location using substantially less total power than would be necessary to provide real time continuous transmission, yet provide the appearance of real time continuous transmission. A sensor assembly is positioned at the data collection location, powered by a battery that is recharged using a solar panel. A clock controlled microprocessing unit controls the data transducers to provide a data sampling rate and a data transmission interval. The data sampling rate for a parameter corresponds to the rate of change of the parameter. The microprocessor unit provides a plurality of data transmission intervals, with each of the data transmission intervals having a predetermined length of time corresponding to the power requirements of the sensor assembly and the current power status of the battery. In this manner, the data output that is provided to the remote receiving station appears to be real time continuous transmission but is actually delayed by the length of time of the data transmission interval. While the invention is particularly well suited for use with a weather station, it can also be used in any situation where power requirements need to be conserved and data needs to be transmitted to a remote location.

19 Claims, 10 Drawing Sheets

WIRELESS WEATHER STATION

BACKGROUND OF THE INVENTION

1. Field of the Invention

The invention relates to the wireless transmission of data collected from instrumentation, in particular, meteorological instrumentation that is contained in a weather station.

2. Description of the Related Art

Weather stations for home and private industry use are well known in the art. The use of such stations, whether for amateur meteorologists or for businesses requiring a precise record of the local conditions, enables a user to collect, record, process and display accurate weather data. Representative of a complete weather station is model WS1000, made by RainWise, Inc. of Bar Harbor, Me. This apparatus will record inside and outside temperature, relative humidity, barometric pressure, wind direction and speed, and rainfall. It is also able to calculate wind chill and store maximums and minimums. Typically, the sensing unit, which houses the weather measuring transducers, is mounted on a mast that is preferably placed in a high location, such as a roof top, so that unobstructed wind speed and direction can be accurately measured. Of course, such a mounting requires that a direct electrical connection exist between the sensing unit and the display/processing unit, which is located inside. In addition to presenting a potential problem from lightning strikes, wiring the necessary cable between the two units is the most difficult and expensive part of what should otherwise be a rather simple installation.

Another example of such a unit is the WEATHER MONITOR II manufactured by Davis Instruments of Hayward, Calif. This device also features several weather sensing transducers, which are mounted on an outside location and then connected to the display by a cable.

A direct electrical connection between the data collection section of the weather station and the data processing/display portion of the unit can often be difficult to achieve, especially when the unit is being used as a home weather station.

It is well known in the art to use a radio transmitter/receiver in situations where it is desirable to have information collected at one location and sent to another location without the need of a direct electrical connection between the two locations. In addition to eliminating the need for connecting a cable between the transmitting data collection assembly and receiving weather data processing unit, the use of such a system also enables the data to be utilized by a number of receiving units. However, a weather station presents a unique set of problems that make present transmitter/receiver systems unsuitable for this task.

If the transmitter is to be powered by AC, then a direct electrical connection is still required. Providing wiring for power to the transmitter presents a similar set of problems to those found when attempting to directly connect the sensor probes to the processing/display unit.

The use of storage batteries to provide power to the transmitter introduces the additional problem of having to frequently service the weather data collection unit to replace the batteries. As noted above, ideally the mast that houses the weather data collection sensors/probes is placed on top of a roof or other location that is not easily accessible and is difficult to reach. Therefore, having to frequently change batteries is an additional burden. Storage batteries charged by solar panels such that both are sufficiently large so that frequent changing is unnecessary, adds significantly to the cost of the equipment and presents additional problems of mounting such a heavy structure atop a roof.

SUMMARY OF THE INVENTION

It is an aspect of the invention to provide a wireless weather station that has a set of meteorological instruments that can measure wind speed, wind direction, outdoor temperature, barometric pressure, rainfall, humidity and other such weather data typically measured using such instruments.

It is an also an aspect of the invention to provide a wireless weather station that can calculate and display wind chill values from the data obtained.

It is another aspect of the invention to provide a weather station that optimizes data accuracy and system performance.

It is a further aspect of the invention to provide a wireless weather station that eliminates the need for any wiring to be run to the sensor assembly, thereby achieving ease of installation and maximum safety from lightning damage.

It is another aspect of the invention to provide a wireless weather station that allows the weather data to be viewed or processed as a stream, thus allowing the user to identify trends in the weather.

It is still another aspect of the invention to provide a weather station that automatically records the daily maximum and minimum conditions for all functions.

It is an aspect of the invention to provide a weather station that allows the data to be recorded at user defined intervals.

It is also an aspect of the invention to provide a wireless weather station that minimizes gaps in the data stream by incrementally changing transmission intervals of data groups and to provide different sampling rates for different transducers to conserve power.

Another aspect of the invention is to provide a wireless weather station that is powered by a battery that is charged by solar power.

It is an aspect of the invention to provide a wireless weather station that minimizes the effects of the variability of solar radiation on data accuracy and life of the electronics.

Another aspect of the invention is to provide a wireless weather station that has at least two transceiver channels to eliminate possible interference.

It is still another aspect of the invention to provide a weather station that eliminates the effects of power line surges on the weather data gathering sensor.

It is another aspect of the invention to provide a wireless weather station that can display current and previous wind directions simultaneously.

It is still another aspect of the invention to provide a wireless weather station that changes the data transmission rate (the rate at which a data set is transmitted to a receiver located within a remote display assembly) determined in accordance with the status of the battery charge.

Another aspect of the invention is to provide a wireless weather station that has a data sampling rate that corresponds to the weather measurement being measured, with a faster sampling rate selected for wind speed and direction than for parameters that change gradually over time.

Finally, it is an aspect of the invention to provide a wireless weather station that provides an apparent real time display even when the battery is substantially less than fully charged and the transmission interval is selected at maximum.

Other aspects and advantages of the present invention will become apparent and obvious from a study of the following description and the accompanying drawings, which are merely illustrative of the invention.

The invention is a wireless data transmission apparatus for measuring a parameter over an extended time at a data collection location. The parameter has a known rate of change. The data corresponding to the measurement of the parameter is transmitted to a remote location using substantially less total power than would be necessary to provide real time continuous transmission. A power resource is provided. A sensor assembly is positioned at the data collection location. The sensor assembly has power requirements that are supplied by said power resource. A data transducer for measuring the parameter is provided. The data transducer provides a transducer output signal corresponding to the parameter. A clock controlled microprocessing unit is provided. The clock controlled microprocessing unit is connected to said transducer and is also powered by said power resource. The microprocessing unit controls said data transducer to provide a data sampling rate and a data sampling interval. The data sampling interval has a predetermined length of time and the data sampling rate has a predetermined sampling frequency, with length of time and sampling frequency corresponding to the rate of change of the parameter. The microprocessor unit provides a plurality of data transmission intervals, with each of said data transmission intervals having a predetermined length of time corresponding to the power requirements of said sensor assembly and the current power status of said power resource. The microprocessing unit provides a data output signal corresponding to said transducer output signal wherein said data output is provided at the remote location in an apparent real time continuous transmission mode that appears to a user to be real time continuous transmission.

DETAILED DESCRIPTION OF THE INVENTION

In order for the installation of the sensor assembly of the weather station to be truly wireless, power for the transducers and the transmitter, which communicates with the receiver in the display assembly must be provided. Therefore, the sensor assembly must include a charging system for its battery or batteries. The preferable charging method is the use of a solar panel. While only the use of a solar panel as the charging method is described in detail, other charging systems, such as a windmill, could be substituted. Since the solar panel must be limited in size, the power output is similarly limited, as power output is proportional to the surface area on such panels. Due to the nature of solar-charged battery systems, the power for the instrument package is limited. The weather station must be able to operate overnight without any sun and must be able to operate throughout the winter and through extended cloudy periods. In practice, the radio transmitter is the greatest power drain, so the system must be designed to transmit intermittently and to minimize the transmission time. However, this must be accomplished with no perceived gaps in the received data as a viewer is looking at the display or data-logging assembly. This limitation of the power supply presents a major challenge in system design and requires the transducer section of such units to be as efficient as possible in its use of power.

While the invention is shown used with a weather station, the apparatus disclosed herein can be used for any situation where a wireless transmission of data is required and where the multiple sample rates are desirable as well as where power resources are variable.

Most commonly measured meteorological parameters, such as temperature, humidity, and barometric pressure, change relatively slowly, usually on a scale of minutes. Of the standard parameters, only wind speed and direction and the parameters derived from those measurements, such as wind chill, change on a scale of seconds. Therefore, the sampling rate for most parameters can be on the order of many seconds or even minutes without the loss of important information. By providing a quick data interval which corresponds to the sample rate for the fastest changing measured parameter, i.e., wind speed/direction and by providing a slow data interval which corresponds to the power requirements and power resources of the system, i.e., the data transmission interval, the data stream has the appearance and usefulness of real time continuous data without the need for the power that would be necessary to achieve such real time continuous output. Further, when other factors make it necessary to have an instant report, the invention can be set to override the slow data interval such that when a measured parameter, such as wind speed, exceeds a maximum or minimum so that an immediate transmission is warranted.

Since the quick data interval is preferably about two seconds, an optimum record of wind speed and direction is obtained. In the preferred embodiment, the slow data interval ranges from 30 seconds with a fully charged battery, to 3.8 minutes when the battery is at its minimum operating level.

As an example, assume the invention is operating with a quick data interval of two seconds, which means the wind speed and direction is sampled every two seconds, and the slow data interval is 30 seconds, which means at the end of 30 seconds, the slow changing transducers such as temperature, etc. will be read and the data, including the 15 two second interval wind speed/direction measurements, will be transmitted. Along with the transmission will be diagnostic information including the instrument battery condition. This facilitates record keeping without requiring the user to retrieve or measure the battery directly. Once the display assembly receives the data, it displays the 15 wind records, one at time, in two second intervals. The slow changing weather parameters are also displayed. A user looking at the display or viewing a graph of the output from the peripheral interface assembly will see the wind change smoothly every two seconds as if it were real time. However, the data is actually 30 seconds old. The only time this lag would be readily apparent would be in the case of a strong wind gust which could be easily perceived without the need for a weather station and the gust would not appear on the display until 30 seconds later. However, in such cases, the invention could be set so that wind gusts above a predetermined speed would cause the unit to transmit immediately.

So that the display or record does not show gaps as the slow data interval changes from 30 to, say, 60 seconds, the transmitter is set to change by only a small amount, preferably two seconds for each transmitting interval, thereby eliminating any abrupt changes.

Figure 2:
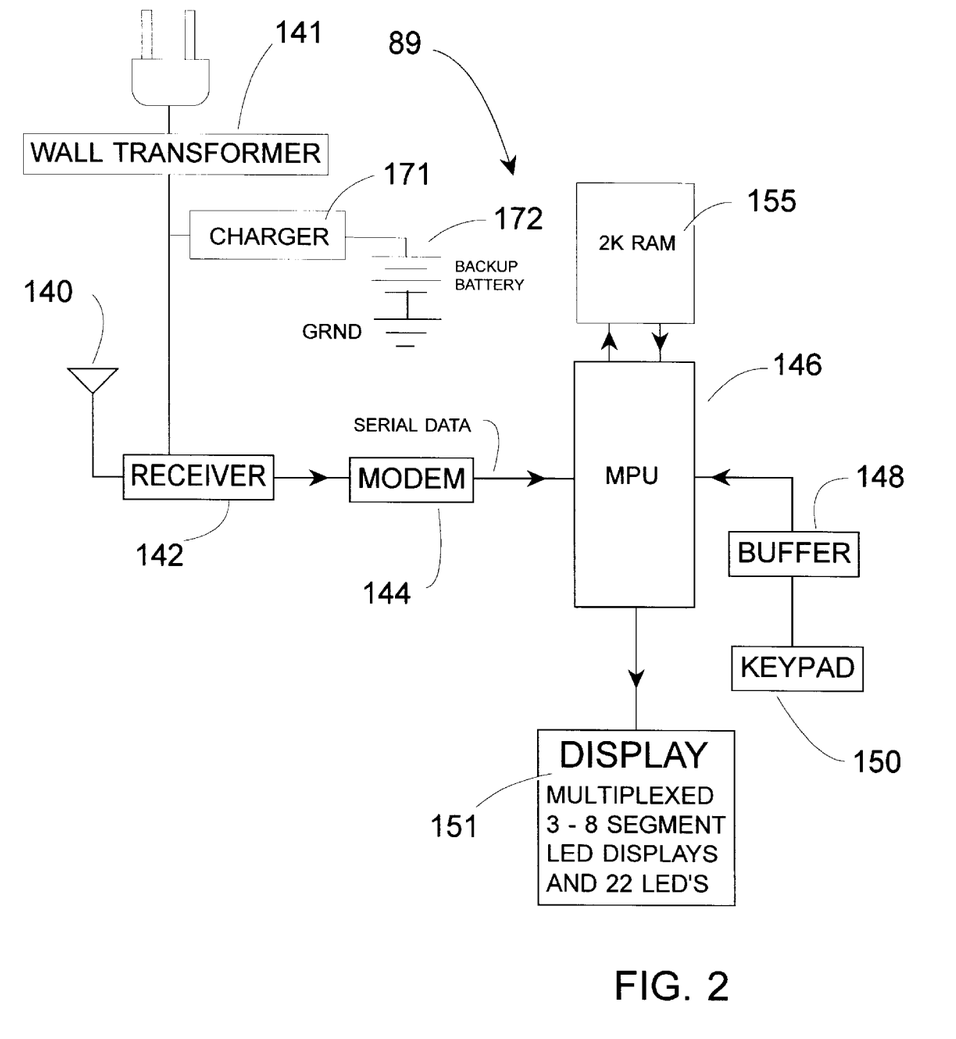
FIG. 2 is a block diagram of the display assembly.
Figure 3:
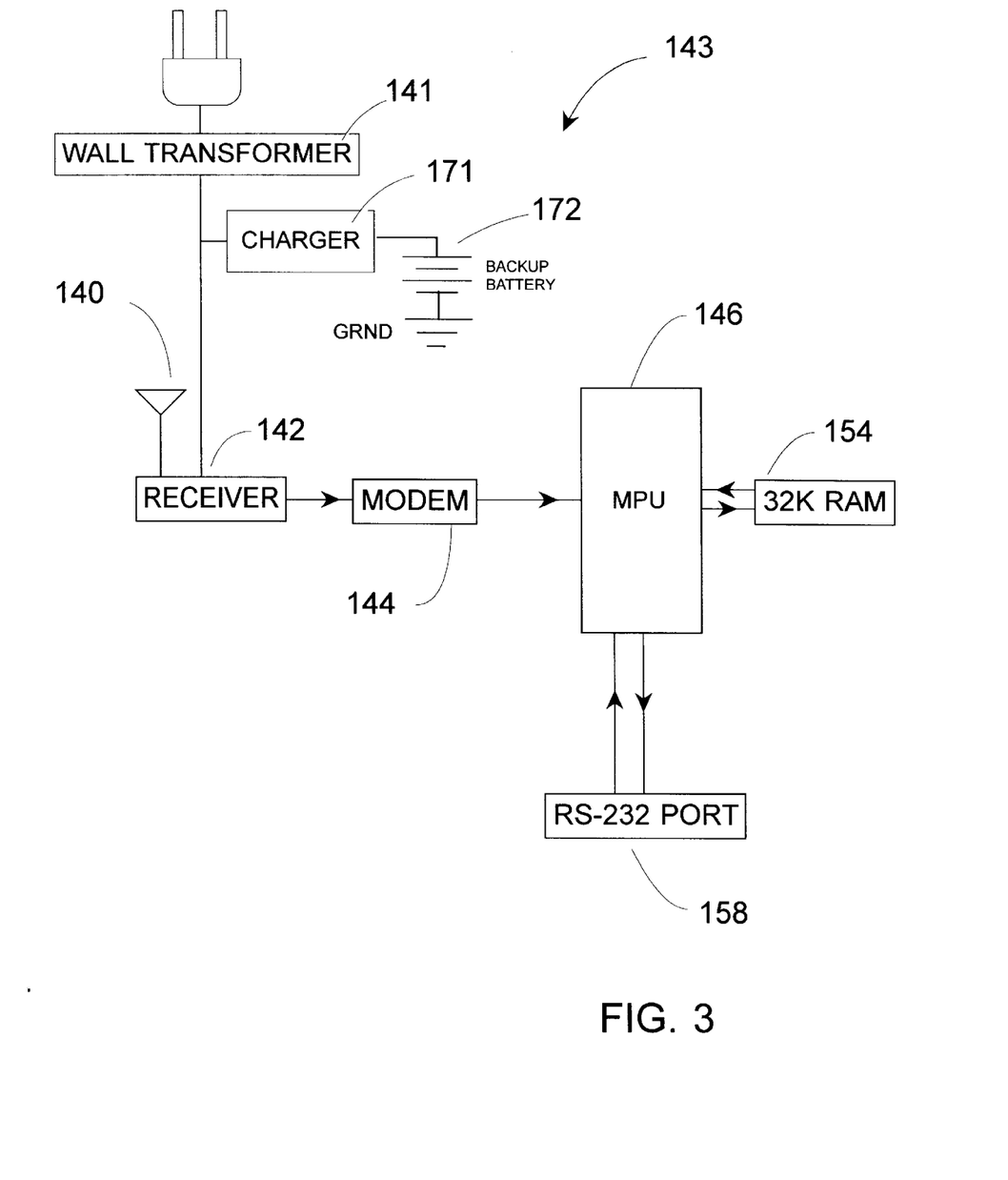
FIG. 3 is a block diagram of the peripheral interface assembly.

The details of how this is accomplished will now be discussed. The invention features a sensor assembly 10 (illustrated in FIG. 1), a display assembly 89 (illustrated in FIG. 2), and an optional peripheral interface assembly 143 (illustrated in FIG. 3). All of the assemblies are controlled by a microprocessor-based central processing unit (MPU 136 in FIG. 1 for the sensor assembly; MPU 146 in FIG. 2 for the display assembly and the peripheral interface assembly 143 as shown in FIG. 3) of the 80C32 variety or equivalent. For the sensor assembly 10, MPU 136 must be CMOS material, which provides low power consumption during operation, and must have software capability to enter a stop mode where power is applied only to on-board RAM. MPU 136 must also have access to 256 bytes of random access memory (RAM) to store the wind data between the transmission intervals. For the display assembly 89 and peripheral interface assembly 143, which are controlled by MPU 146, CMOS material is not necessary.

Figure 1:
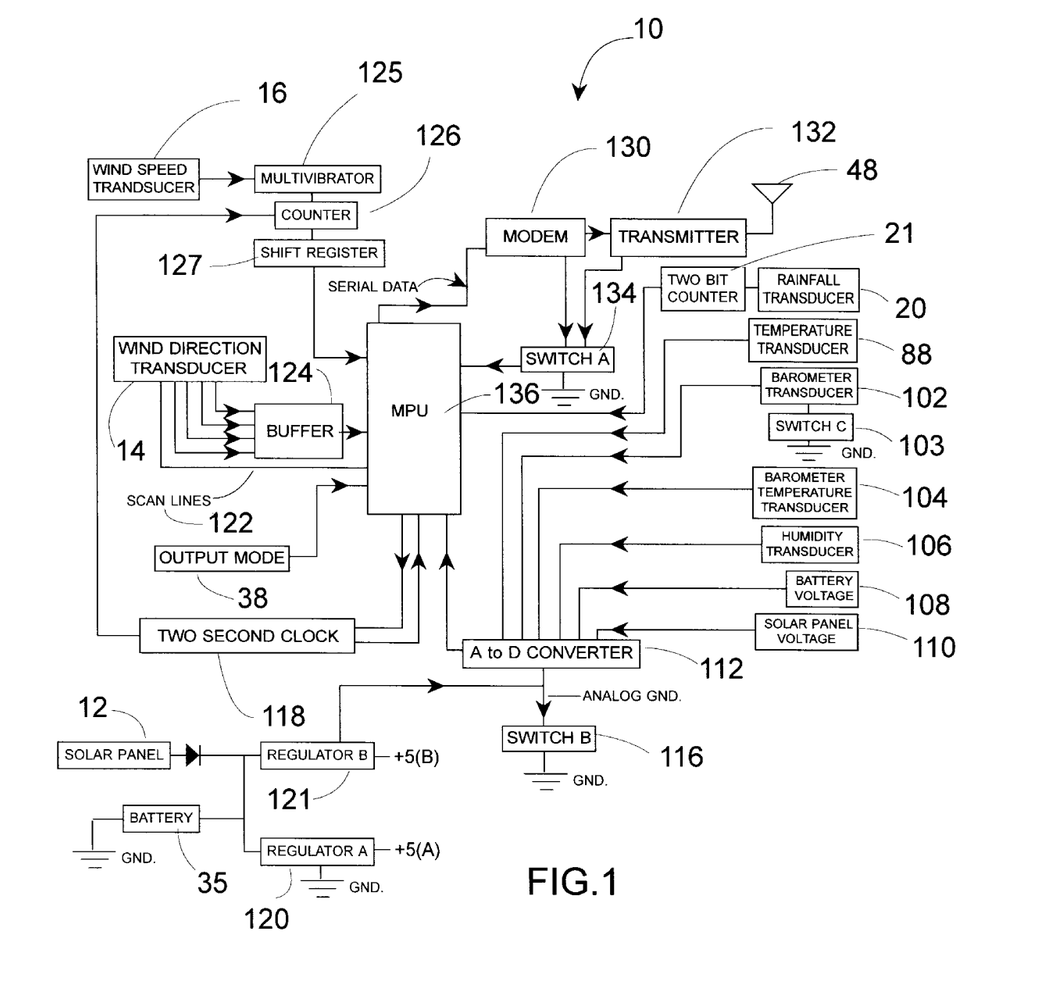
FIG. 1 is a block diagram of the sensors and electronics of the sensor assembly.

Referring now to FIG. 1, the circuitry of sensor assembly 10 is shown. The 12-volt battery 35 powers the transmitter 132 directly. Battery 35 is preferably a sealed lead acid battery. Two 5-volt regulators 120, 121 power all other circuits for the transmitter. The regulator 120 is a low quiescent current voltage regulator, which provides power for all integrated circuits that are always powered up (21, 118, 124, 125, 126, 127, and 136) and MODEM 130, which is powered at transmission time. The regulator 121 is controlled by switch B 116. The power to the MODEM 130 and transmitter 132 is controlled via the switch A 134. The power to the A-to-D converter 112 and all analog transducers: temperature transducer 88, barometer temperature transducer 104, humidity transducer 106, except the barometer transducer 102, is via switch B 116. The power to the barometer transducer is via switch C 103. The wind direction transducer 14, wind speed transducer 16 and rainfall transducer 20 are passive circuits.

The binary data from the MPU 136 is sent to the MODEM 130 which converts the binary data stream to a frequency shift keying (FSK) waveform which is compatible with the input of the transmitter 132 so that the radiation from the antenna 48 is in compliance with FCC regulations. The present design employs FSK modulation because of the MODEM integrated circuit used. Other modulation techniques such as amplitude modulated, amplitude shift keying, phase shift keying or combinations and variations of these modulation techniques can also be used.

The digital signal lines between the A-to-D converter 112, the MODEM 130 and the MPU 136 are isolated with diodes and transistors using components and techniques well known in the art and are not shown in FIG. 1. The isolation diodes and transistors conserve power by preventing excessive currents when the various components are powered down.

The sensor assembly 10 contains a crystal controlled clock 118, which serves to control the gathering of wind speed data for one second and provides a wake up signal to the microprocessor 136 every two seconds. The wind speed, direction and rainfall are recorded when the microprocessor 136 is awakened.

The analog transducer voltage outputs are first conditioned with standard low power operational amplifiers to amplify and level shift, and then converted to binary output by A-to-D converter 112. A-to-D converter 112 is preferably the type having an 8 channel multiplexed input and a serial shifting output, although other types of A-to-D converters can be used.

Figure 9:
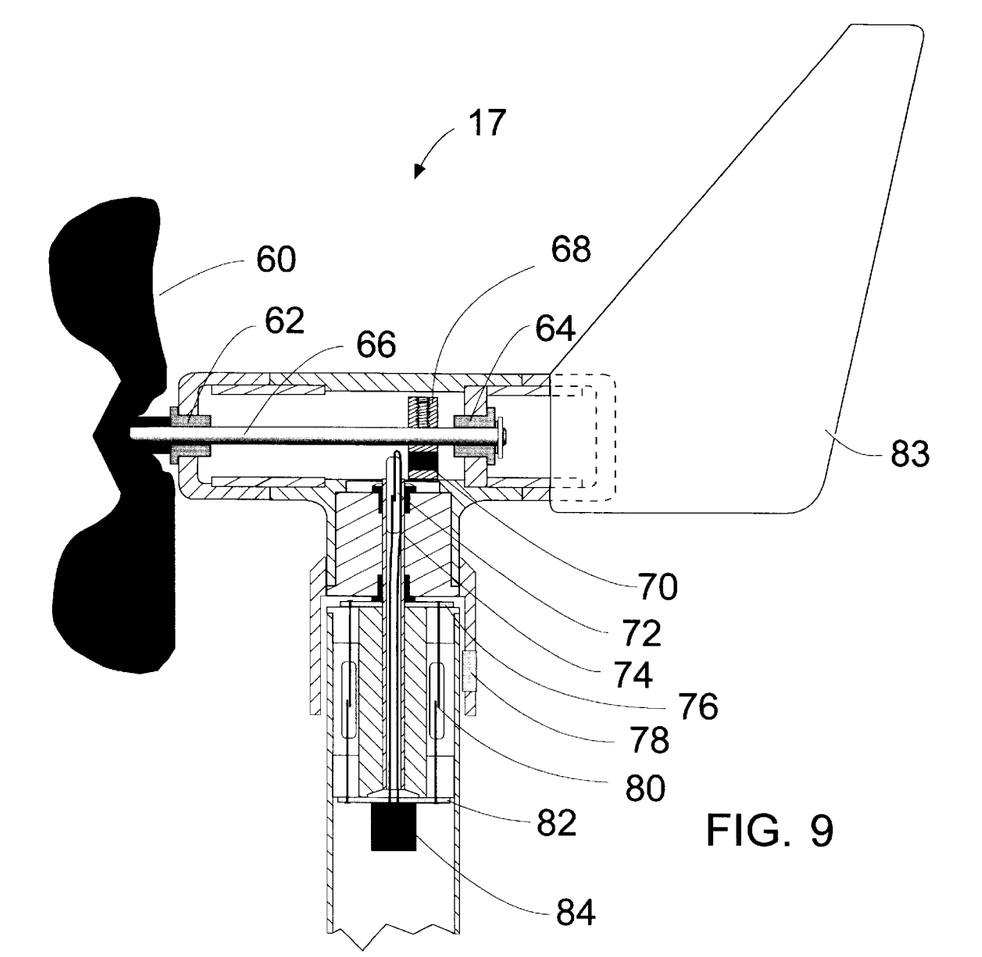
FIG. 9 is a cross-sectional view of the wind speed transducer and the wind direction transducer across section line 9—9 as shown in FIG. 6.

Referring now to FIG. 9, the wind speed transducer and wind direction transducer will be explained. The wind speed transducer 16 generates pulses provided by reed switch 72 and rotating magnet 70. These pulses trigger a monostable multivibrator 125 set up to lengthen the pulses. This prevents multiple counts when the switch 72 closes. The output of the multivibrator 125 is input to a counter 126 which is input to a shift register 127. The data in the shift register 127 is read by the MPU 136.

The wind direction transducer 14 operates by means of 8 reed switches 80 and a magnet 78. While a magnet is shown activating a reed switch for both the wind speed transducer and the wind direction transducer, Hall Effect sensors can be substituted. These switches 80 are read by the MPU 136 through the buffer 124 in two groups of four. A group of four consists of four reed switches 80 with one end pulled to the +5 volt supply through a resistor. The other end of the four switches 80 are tied together and connected to a port pin on the MPU 136. The two lines from the MPU 136, called scan lines 122, and 4 data lines allow the 8 reed switches to be tested for closure by the MPU 136. The two groups of four are interlaced so that each member of one group has a member of the second group adjacent to it.

The eight switches 80 are normally open, and magnet 78 will pull one or two of the switches 80 closed, depending on the position of the vane 83. When magnet 78 is directly in front of a particular switch 80, only that switch will close. When magnet 78 is between two switches, both will close. Thus, 16 directions are resolved from the eight switches.

Figure 10:
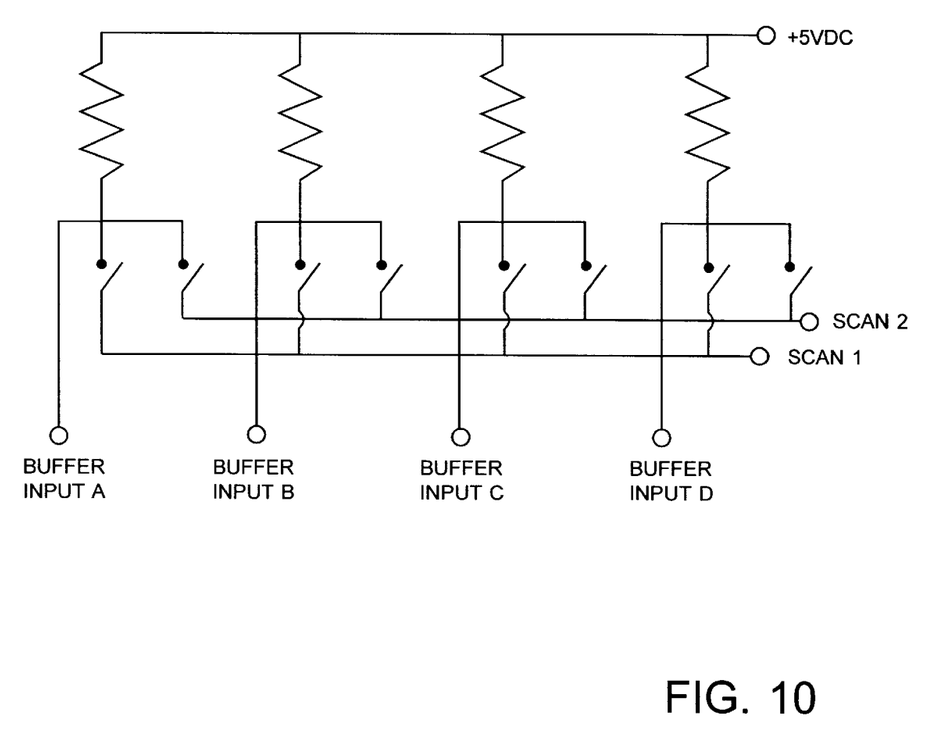
FIG. 10 is a schematic of the wiring for the wind direction reed switches.

Referring now to FIG. 10, the eight switches 80 are multiplexed two per wire as follows: each pair of two switches is connected to the common +5 volt line through a "pull-up" resistor, and the bottom of each switch is connected to a scan line. On each of the four wires, the two switches are connected to separate scan lines. The MPU 136 can set either scan line to +5 VDC or to ground (0 VDC). When a scan line is at +5 VDC, both ends of the reed switch on that scan line are at +5 VDC, so the switch has no effect; no current will flow whether the switch is open or closed. However, when a scan line is at ground, and a reed switch is closed, the reed switch will connect its pull-up resistor to ground.

The output of each pair of reed switches is the junction between the pull-up resistor and the reed switch. If the scan line is at ground, this point will be at +5 VDC if the switch is open, or at ground if the switch is closed.

When the MPU 136 is stopped and both scan lines are set to +5 VDC, the wind direction sensor draws no current. To read the sensor, the MPU grounds one scan line and reads the four switches on that line via the buffer. Then the MPU resets the scan line to +5 VDC, grounds the second scan line, and reads the second set of four switches via the same buffer. The processor then tests the eight input bits to determine which one or two switches are closed.

As shown in FIG. 10, the MPU 136 grounds scan 1 to read the N, E, S, W switches on the buffer, and grounds scan 2 to read the NE, SE, SW, and NW switches. The novel system accomplishes this function without the use of any electronic parts in the sensor assembly, only passive switches and resistors.

The rainfall sensor 20 contact closure activates a two bit counter whose output is sensed directly by the microprocessor 136.

The temperature transducers 88 and 104, barometer transducer 102 and humidity transducer 106 are of the voltage output type. The physical stimulus results in a voltage response. The voltage output from the transducers is signal conditioned by common operational amplifier circuits to amplify and level shift for input to the A-to-D converter 112.

Battery voltage 108 and solar panel voltage 110 measurements complete the information set that is provided by the sensor assembly 10.

The microprocessor 136 is interfaced to an output mode switch 38 which selects either continuous or intermittent output of the transmitter 132 and other functions as listed below. The continuous mode is provided to allow setup and testing of the sensor assembly 10. In this mode, constant power is maintained on all sub-systems. Data is transmitted to the display assembly 89 (illustrated in FIG. 2) every two seconds. At this level of power consumption, battery 35 is discharged faster than the solar panel 12 can re-charge battery 35, even in bright sunlight. Therefore, the normal mode of operation must be intermittent due to power consumption limitations. Operation is carried out in the intermittent mode.

The intermittent mode is the power saving mode and is achieved as follows. After the power saving mode is started, the two-second clock 118 restarts the MPU 136 every two seconds. The MPU 136 reads and records outputs from the wind speed transducer 16 and wind direction transducer 14 which are directly saved to the MPU 136 internal RAM. Since the rainfall transducer 20 is input from the two bit counter 21, the software tests for a change in the counter value since the last two-second interval. This difference is then added to an internal MPU 136 RAM counter to be transmitted in the first block of data discussed below.

If it is not time to transmit and it is not time to turn on the barometer transducer 102, the MPU 136 is put into the stop mode by software.

If it is not time to transmit and it is time to turn on the barometer transducer 102, the barometer transducer 102 is switched on by switch C 103 and the MPU 136 is put into the stop mode by software.

The barometer transducer 102 is switched on 15 seconds before transmission.

If it is time to transmit, then switch A 134 and switch B 116 are activated, allowing the transducers, the voltage of battery 35 and the voltage of solar panel 12 to be read and, if it is time, the barometer transducer 102 to be read and corrected for temperature.

After the data has been transmitted, the battery 35 and solar panel 12 voltages are tested to determine the next transmission time based on algorithms described below. The minimum interval between transmission is 30.0 seconds.

The amount of energy available is proportional to the battery voltage 108. However, measuring the battery voltage 108 when the solar panel is charging may lead to an incorrect determination of the amount of energy remaining in the battery. This is especially a problem near the winter solstice when the battery voltage 108 can dramatically increase for a few hours while the solar panel 12 is charging the battery 35. The software accounts for the fact that the battery 35 has been charged for only a few hours from the reading of the solar panel voltage 110. Therefore, the data transmission times are the result of the battery voltage 108 modulated by the time the solar panel voltage 110 is measured over a specified voltage.

The preferred algorithm is as follows:

1) If battery voltage 108 is greater than 14.0 VDC, then leave transmitter 132 on continuously. This serves to limit overcharging of battery 35.

2) If battery voltage 108 is greater than 12.06 VDC, then the time interval between data transmission is selected to be 30 seconds. Note that this voltage represents approximately 50% depletion of a fully charged battery.

3) If battery voltage 108 is less than 12.06 VDC, but greater than 11.64 VDC, then the time interval between data transmission is selected to be 60 seconds.

4) If battery voltage 108 is less than 11.64 VDC, then the time interval between data transmission is selected to be 3.8 minutes.

5) If battery voltage 108 is less than 10.50 VDC, then microprocessor 136 enters shutdown mode, ceasing all transmitting and sensor readings, but reading battery voltage every 8 minutes. Shutdown mode remains in effect until battery voltage 108 is greater than 11.1 VDC. At 10.5 VDC, the battery 35 has a minimal amount of remaining energy; this strategy allows the solar panel 12 to return the battery 35 to approximately 20% capacity before transmission resumes.

The battery voltage 108 and times shown represent characteristics of a given battery 35, transducer circuitry and transmitter 132 combination. Times and voltage 108 would be varied to optimize the system for different components. Accumulated data values are transmitted in bursts, as described below, to drive a change in the displayed or peripheral interfaced values every 2 seconds by reading the data string for each function contained in the burst. The next transmission will normally occur as the display 89 shows the last set of values in the previously received data string. While this is not a real time data display, it does allow the user to observe trends in conditions without requiring continuous data transmission which, in turn, would require more power than the solar panel 12 and battery 35 are capable of supplying on a continual basis due to constant powering of the transducers, the microprocessor 136 and the transmitter 132. As noted above, under special circumstances, such as weather emergencies, the invention can be programmed to transmit immediately if a threshold condition is met. Also, the quick data interval or sampling rate of two seconds could also be changed, either faster or slower, depending on the circumstances.

Changes in transmission time are made in 2 second increments in order to make the changes as inconspicuous as possible at the display assembly 89 or peripheral interface assembly 143, as these changes will result in delays in data change rates as the transmission intervals increase. As noted above, if the transmit time is switched instantly from 30 seconds to 60 seconds, there would be a 30 second gap in the data updating at the display assembly 89 or peripheral interface assembly 143 due to the display assembly 89 or peripheral interface assembly 143 running out of received data points, as only enough points are transmitted for 14 refreshes when in the 30 second transmit mode. The invention minimizes this problem by increasing intervals of transmission in 2 second increments so that the first interval after the increase is called for would be 32 seconds, the second increase would be 34 seconds, etc. until the desired transmission interval is achieved, thus requiring only one 4 second increment in data refresh time as compared to the normal 2 second time interval, this 4 second interval occurring every 30 seconds.

The transmitted data string begins with a header character followed by a block of 10 bytes which contains the analog and rainfall sensor 20 values, and the oldest wind sample. This block is one of the sections of the transmission which are repeated as described in the next paragraph. One byte in the 10-byte block is the count of the wind records, which will follow. Rainfall sensor 20 reads the rainfall count every two seconds, however, only the total rainfall is output in the 10-byte block. The next block is of varying length and contains the wind speed and wind direction samples. This block also is repeated. The number of wind samples depends on the transmission interval. For example, an interval of 30 seconds would lead to a set of 14 samples, giving one sample for every two seconds since the previous transmission. Transmissions also include in the transmission a code to relate diagnostics of the transducer/transmitter unit. This diagnostic code includes, but is not limited to, the version of the software which is running in the unit, the condition of the battery and other functional statuses as required.

Referring now to FIGS. 2 and 3, when the sensor assembly 10 is in intermittent operation, the data is input to the display 89 and/or the peripheral interface assembly 143 in a burst which contains ten bytes of data followed by a variable number of wind speed and direction record bytes as described previously. In order to provide a dynamic display (or smooth data stream for the peripheral interface assembly 143), this data burst is stored in RAM 154, 155 in the sequence as measured in the sensor assembly 10. Therefore, the displayed data is 30 seconds to 3.8 minutes old depending on the delay time between transmissions, which is, in turn, determined by the battery voltage 108 and solar panel voltage 110, as described previously. However, the display assembly 89 shows data trends with no gaps.

Sending the signal twice minimizes false readings due to radio interference and/or weak signals. While various error detection techniques exist in the art, the present method is preferred due to the relatively small quantity of data that needs to be transmitted. This double data set is compared by the microprocessor 146 and the data is rejected if both copies do not match.

The display assembly 89 and peripheral interface assembly 143 units are controlled by a standard configuration MPU 146 of the 8032 variety or equivalent as noted above. Only 128 bytes of internal RAM are required as the input blocks of wind data are stored as received in the external 2K RAM 155 in the display assembly 89 or 32K RAM 154 in the peripheral interface assembly 143. The display uses much of its internal RAM for other functions and thus does not have as much space available for wind data as the sensor box, so external ram is required. In the case of the peripheral interface, the larger external RAM is required for data logging.

The display assembly 89 and peripheral interface assembly 143 each receive data from the receiver 142 through a MODEM 144 which converts the FSK or other type of modulation to a binary stream.

Figure 4:
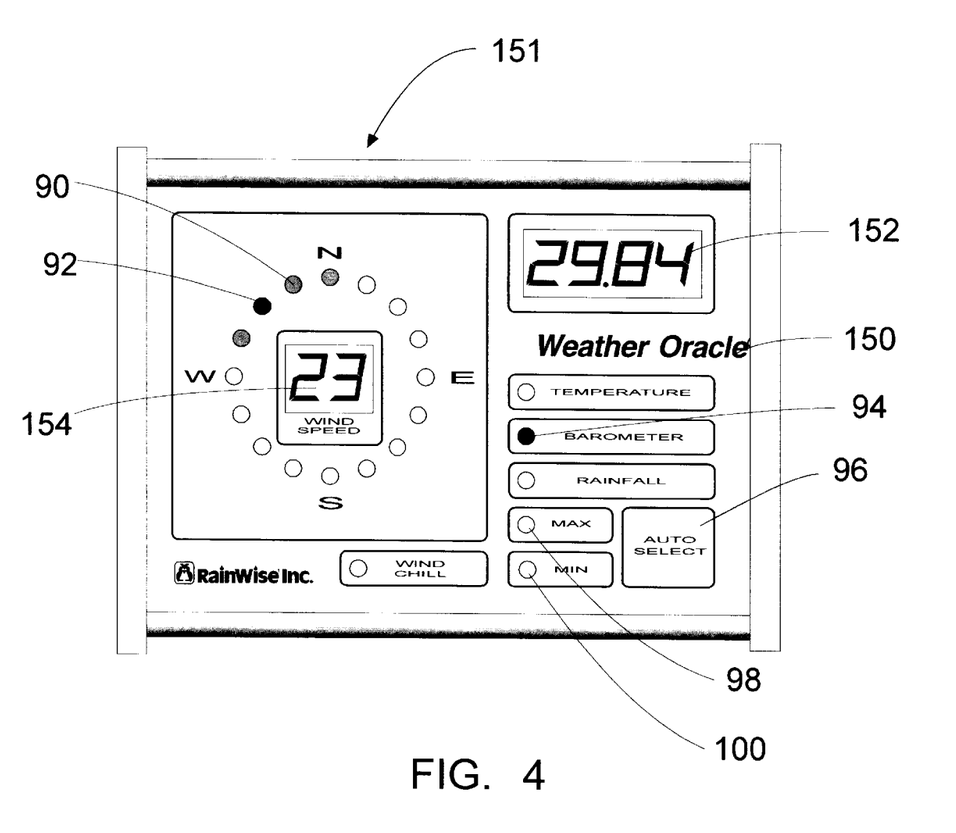
FIG. 4 is a front view of the display.

As shown in FIG. 4, in the display 151, the MPU 146 provides the multiplexing of the digital displays 152, 154, the wind direction light emitting diodes (LEDs) 90, 92, as well as the function indicator LEDs 94 and error checks in the incoming data. The wind direction LED 92 is indicated at full intensity which is showing the wind direction at the present two second interval, while the three LEDs 90, shown at half intensity, indicate the previous 15 wind direction transducer 14 readings which correspond to the past 30 seconds. This has the effect of showing the variation of wind direction.

Keypad 150 is used to set up display assembly 89. The housing may be wall mounted using the keyhole slots (not shown) provided in the back of the housing. An angle foot (not shown) may be installed in place of the battery cover when it is desired to place the display on a desk or table.

Receiver 142 is preferably connected to the display housing by a five-foot cable. This cable, plus the cable from the wall transformer 141, allows over ten feet from a power outlet to the display assembly 89. Receiver 142 may be placed in any convenient location. The output from the wall transformer 141 is a low voltage (9 VDC). Minimizing the effects of radio frequency interference generated by the MPU 146 on the radio receiver 142 is accomplished by separating the receiver from the display assembly 89 and/or peripheral interface assembly 143. The receiver 142 is placed in a separate enclosure into which the power for the display assembly 89 and/or peripheral interface assembly 143 is attached. A second cable from the receiver 142 carries the power and signal to the display assembly 89 and/or peripheral interface assembly 143.

To set up display 151 using keypad 150, MAX pad 98 is pressed and held while AUTO SELECT pad 96 is also pressed. Once in the set-up mode, pressing AUTO SELECT pad 96 enables the selection of the time, date, and English or metric units for the data that is to be presented. Also, the temperature and barometer can be adjusted using MAX pad 98 and MIN pad 100 to set the correct respective readings.

Provision is made for a 7.2-volt re-chargeable Nickel-Cadmium battery 172 to provide a memory backup in the event of a power outage. The display assembly 89 has a built-in charger 171 for battery 172. The battery 172 will hold the memory for two hours. In the event of a power outage, battery 172 is used to run everything except the LEDs, so that new data is received during the outage and maximum winds, etc. are recorded for later viewing.

The peripheral interface assembly 143 is equipped with the same receiver section as is used for the display assembly 89, with the FSK data stream or other modulation method being converted to binary format by the modem 144 as in the display assembly 89. The data is processed by the microprocessor 146 in similar methods to the display unit 89. This unit is equipped with 32K bytes of static RAM 154 for data storage and an RS 232 serial port 158 for connection to a computer or printer. The peripheral interface assembly 143 is capable of storing data at user defined intervals as well as being able to record daily high and low values for each function automatically.

Figure 5:
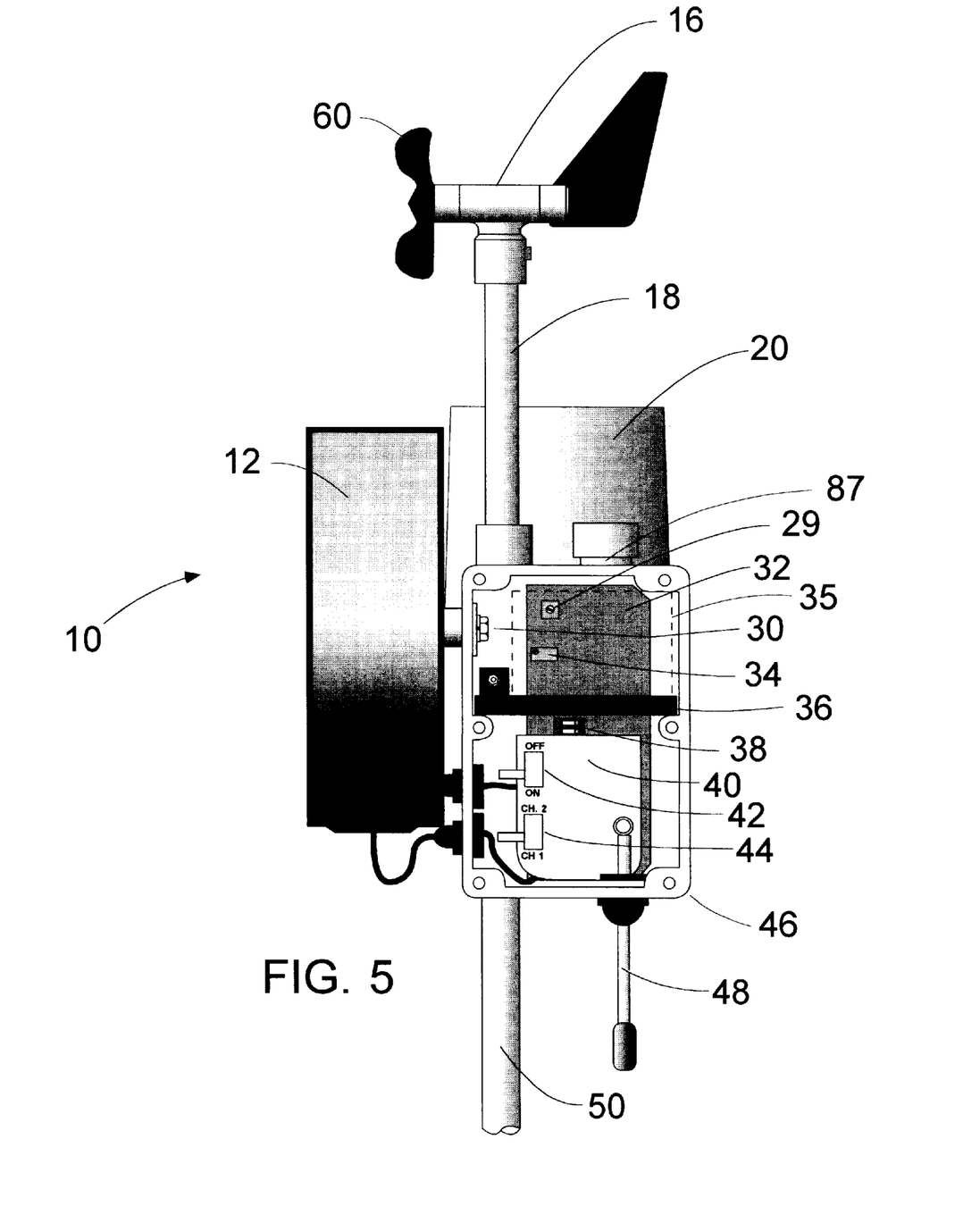
FIG. 5 is a front view of the sensor assembly, with the electronics enclosure open and with the solar shield and battery removed.
Figure 6:
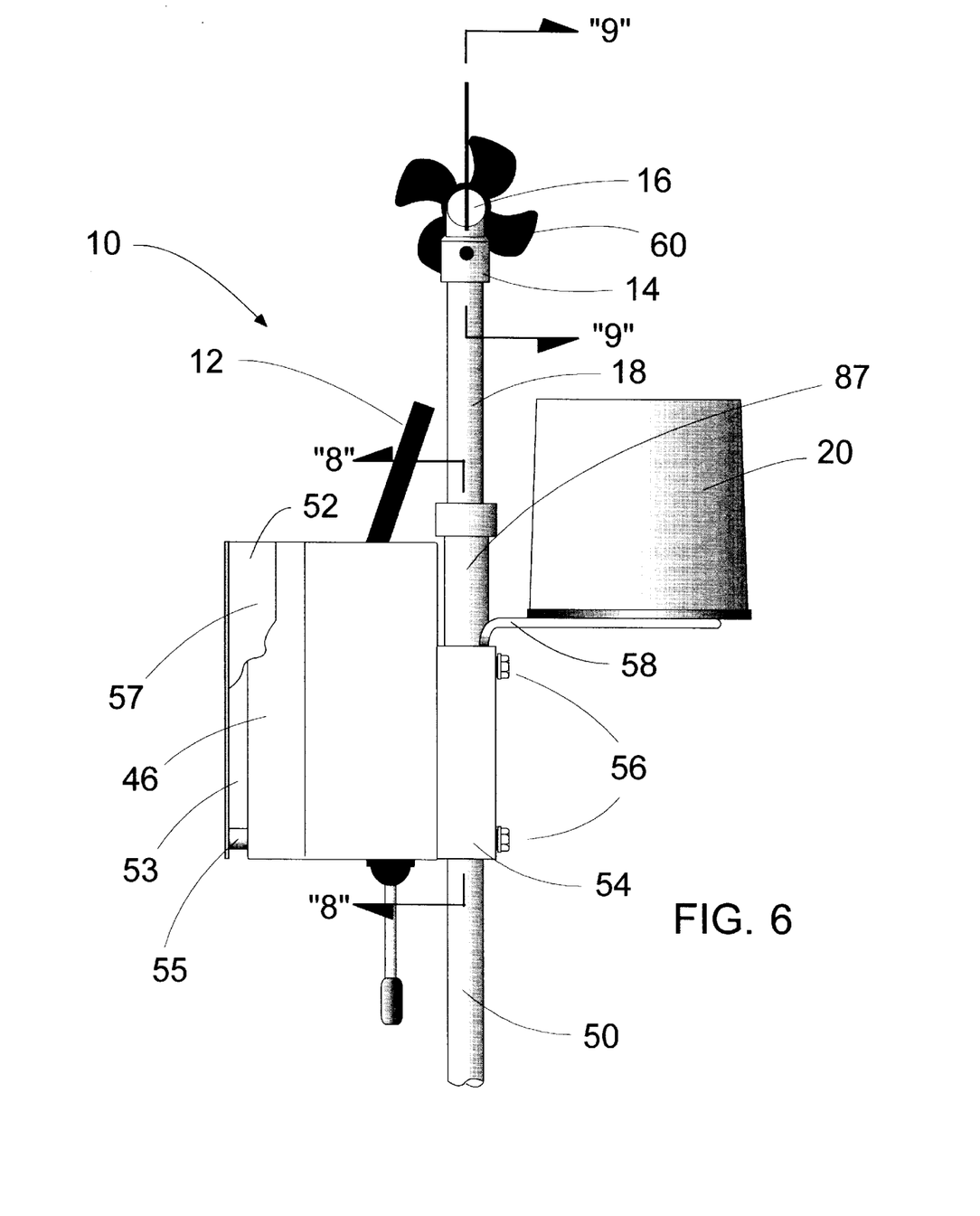
FIG. 6 is a right side view of the sensor assembly with solar shield shown partially cut away to reveal the air gap between the shield and the electronics enclosure.
Figure 7:
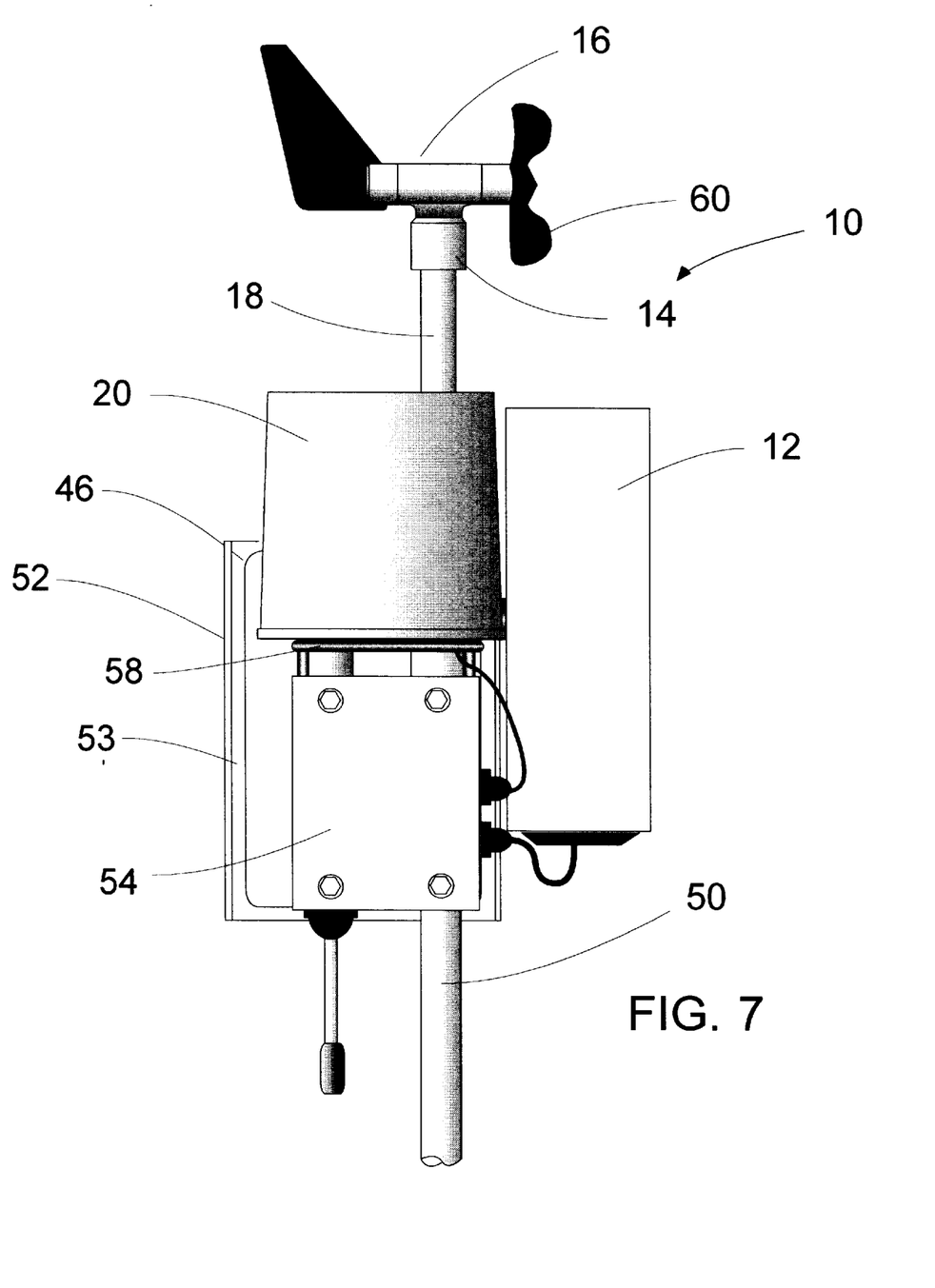
FIG. 7 is a rear view of the sensor assembly.

Referring now to FIGS. 5–7, the preferred embodiment of the sensor assembly 10 is shown. The components are typically mounted on an aluminum support mast 50, which is mounted on a roof or tower. Sensor assembly 10 must be oriented so that the solar panel 12 will face true south in order for solar panel 12 to receive maximum solar radiation.

As detailed in FIG. 6, solar shield 52 is used to minimize the effects of solar radiation on the sensor assembly 10. The solar shield 52 is made of glossy white U-shaped polyvinyl chloride (PVC) material. The legs 57 of shield 52 extend onto the left and right sides of housing 46 and are oriented in the same direction as the solar panel 12. The glossy material has a high reflectivity in the visible portion of the suns spectrum. The shield is displaced from the enclosure 46 by an air space 53, thus, any heating of the shield 52 can only be conducted to the enclosure 46 by means of the four mounting screws 55. Air currents between the shield 52 and housing 46 are not trapped; therefore convective heat transfer to the housing 46 is minimal. Since the barometer transducer 102 is mounted with the housing 46, a separate temperature transducer 104 is provided so that the thermal effects on the barometer transducer 102 can be accounted.

Figure 8:
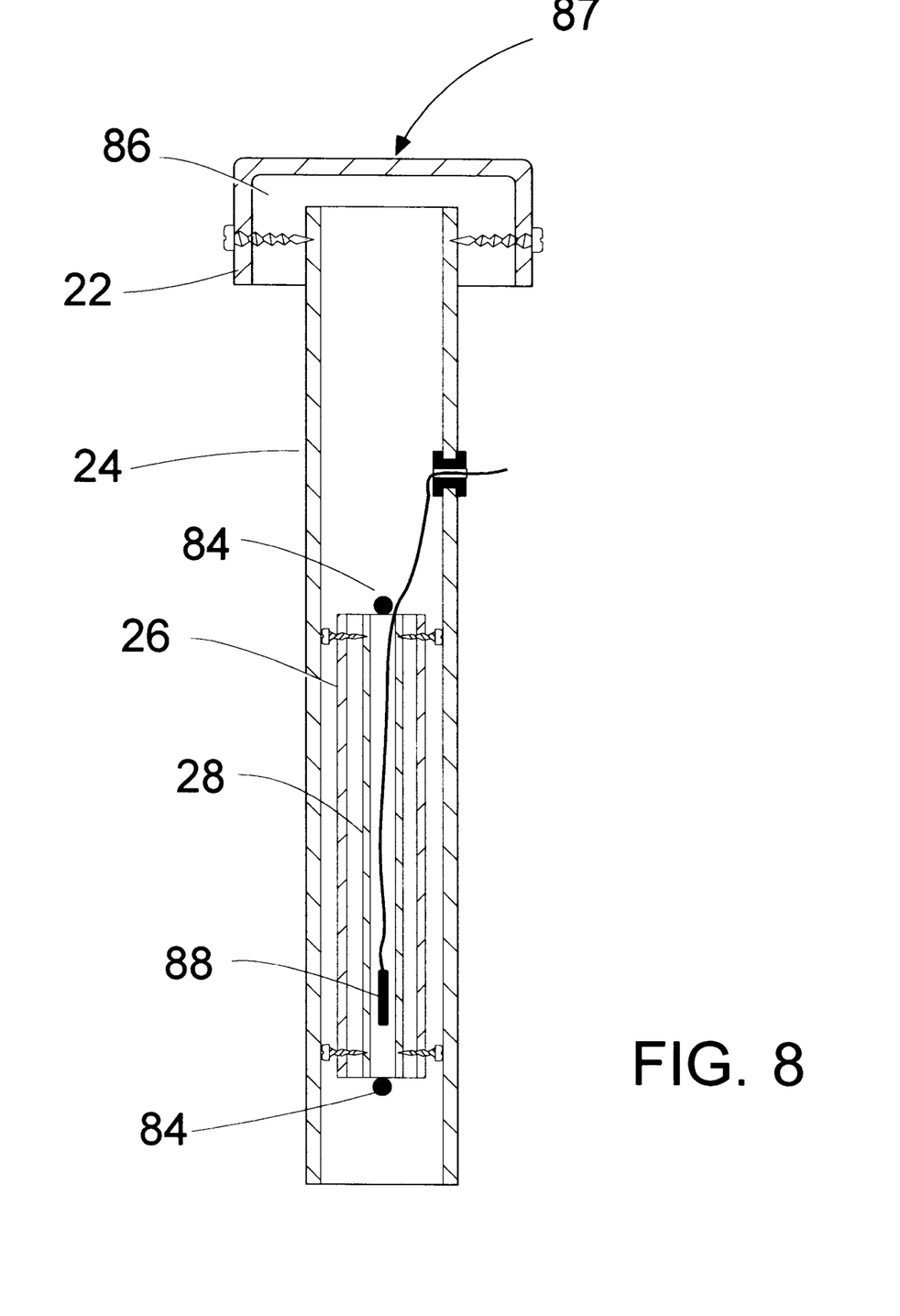
FIG. 8 is a cross-sectional view of the temperature transducer housing and its thermal shielding assembly across section line 8—8 as shown in FIG. 6.

The temperature/relative humidity transducer 88 is shielded from the solar heating by first being located in a shield, positioned on the north side of the housing 46. The temperature relative/humidity transducer 88 itself is shielded from solar heating effects by housing 87. Housing 87 uses three concentric tubes 24, 26, 28 and cap 22 to shield transducer 88 from solar heating. The temperature/relative humidity transducer 88 is located on the centerline of the innermost tube 28. The outermost tube 24 extends higher than the inner two tubes 26, 28 where tube 24 is joined to a protective cap 22, which serves to shield the assembly from rain or debris entry. The position of cap 22 allows warm air to escape the shield assembly at the top and ambient air to enter at the bottom such that housing 87 provides excellent protection from any solar heating of the temperature transducer 88.

While there have been described what are at present considered to be the preferred embodiments of this invention, it will be obvious to those skilled in the art that various changes and modifications may be made therein without departing from the invention and it is therefore, aimed to cover all such changes and modifications as fall within the true spirit and scope of the invention.

What is claimed is:

1. A wireless data transmission apparatus for measuring a parameter over an extended time at a data collection location, the parameter having a rate of change, and then transmitting data corresponding to the measurement of the parameter to a remote location using substantially less total power than would be necessary to provide real time continuous transmission, said apparatus comprising:

a power resource;

a sensor assembly positioned at the data collection location and having power requirements that are supplied by said power resource, said sensing assembly comprising:

a data transducer for measuring the parameter, said data transducer providing a transducer output signal corresponding to the parameter;

a clock controlled microprocessing unit, connected to said transducer and also powered by said power resource, said microprocessing unit controlling said data transducer to provide a data sampling rate and a data sampling interval, said data sampling interval having a predetermined length of time and said data sampling rate having a predetermined sampling frequency, with length of time and sampling frequency corresponding to the rate of change of the parameter, and said microprocessor unit providing a plurality of data transmission intervals, with each of said data transmission intervals having a predetermined length of time corresponding to the power requirements of said sensor assembly and the current power status of said power resource such that said microprocessing unit provides a data output signal corresponding to said transducer output signal wherein said data output is provided at the remote location in an apparent real time continuous transmission mode that appears to a user to be real time continuous transmission.

2. The apparatus of claim 1 further comprising random access memory, associated with said microprocessing unit, for storing a plurality of measurements, wherein each measurement corresponds to the data sampling interval and the total number of measurements corresponding to the data transmission interval and the data sampling frequency.

3. The apparatus of claim 2 further comprising a transmitter for transmitting said measurements to the remote location, wherein said transmitter intermittently transmits in accordance with the data transmission interval currently selected.

4. The apparatus of claim 1 further comprising an analog to digital converter connected between said transducer and said microprocessor such that the transducer output signal of said transducer is converted from an analog to a digital signal.

5. The apparatus of claim 1 wherein said transducer is at least one sensor selected from the group consisting of a wind speed sensor, a wind direction sensor, a rainfall measuring sensor, a barometric sensor, a temperature sensor, a voltage sensor, and a humidity sensor.

6. The apparatus of claim 1 wherein said apparatus further comprises a display assembly located at the remote location wherein said display assembly comprises:

a receiver adapted to receive the measurements provided by said transmitter, said receiver providing a receiver output signal corresponding to said measurements;

a second clock-controlled microprocessing unit, connected to receive the output signal of said receiver, said second clock controlled microprocessing unit being substantially synchronized with said clock controlled microprocessing unit of said sensor assembly;

a display, connected to said second microprocessor unit of said display assembly, wherein said display displays the receiver output signal which corresponds to the measured parameter delayed by the length of time of the data transmission interval.

7. The apparatus of claim 1 wherein the data sampling interval is approximately two seconds.

8. The apparatus of claim 1 wherein the data transmission interval ranges from approximately 30 seconds to approximately 240 seconds.

9. The apparatus of claim 1 wherein the data transmission interval changes by a predetermined amount between one selected data transmission interval and the next selected data transmission interval.

10. The apparatus of claim 9 wherein the predetermined amount of change from one selected data transmission interval and the next one is approximately 2 seconds.

11. The apparatus of claim 1 further comprising an override switch that will override the data transmission interval so that when a measured parameter exceeds a preset value, transmission of the data output signal will be immediate.

12. The apparatus of claim 1 further comprising a charging unit such that said power resource can be recharged.

13. The apparatus of claim 3 wherein said power resource has a measurable voltage such that when the measured voltage of said power resource is greater than a first predetermined value, said transmitter transmits continuously.

14. The apparatus of claim 13 wherein said first predetermined voltage value is approximately 14 volts.

15. The apparatus of claim 3 wherein said power resource has a measurable voltage such that when the measured voltage of said power resource is less than a second predetermined value, said apparatus enters a shutdown mode, ceasing all transmitting and all sensing except the power resource measurement such that said apparatus continues in the shutdown mode until power resource voltage is greater than or equal to a third predetermined value.

16. The apparatus of claim 12 wherein said power resource is a lead acid battery and said charging unit further comprises a solar panel.

17. The apparatus of claim 2 wherein said microprocessor is controllable to provide a stop mode where electrical power is applied only to said random access memory.

18. The apparatus of claim 3 further comprising a modem connected between said microprocessor and said transmitter such that the data output signal provided by said microprocessor is converted from a binary data stream to a frequency shift keying waveform when provided to said transmitter so that the transmission from said transmitter to the remote location is in compliance with FCC regulations.

19. The apparatus of claim 3 further comprising modulation means, connected between said microprocessor and said transmitter, for modulating the data output signal provided by said microprocessor before the data output signal is transmitted by said transmitter.

* * * * *